W. H. SAUVAGE.
HAND BRAKE.
APPLICATION FILED AUG. 7, 1919.
1,343,009.
Patented June 8, 1920.
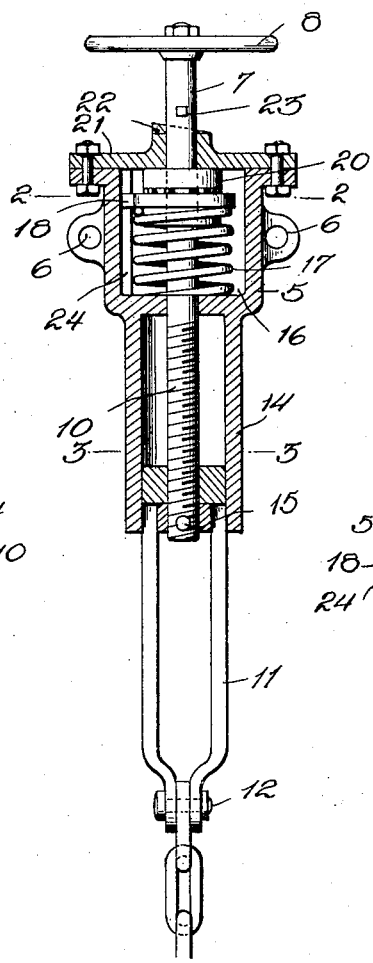

UNITED STATES PATENT OFFICE.

WILLIAM H. SAUVAGE, OF FLUSHING, NEW YORK, ASSIGNOR TO ATLANTIC HAND BRAKE CORPORATION, OF BUFFALO, NEW YORK.

HAND-BRAKE.

1,343,009. Specification of Letters Patent. Patented June 8, 1920.

Application filed August 7, 1919. Serial No. 315,911.

*To all whom it may concern:*

Be it known that I, WILLIAM H. SAUVAGE, a citizen of the United States, residing at Flushing, Long Island, in the county of Queens and State of New York, have invented certain new and useful Improvements in Hand-Brakes, of which the following is a specification.

This invention relates to improvements in hand brakes and more particularly to hand brakes for use on railway vehicles of all kinds.

One of the objects of the present invention is to provide a high power hand brake of simple and practical construction and adapted to prevent overload being exerted on the foundation brake rigging during application.

Another object is to provide a strong and durable hand brake which may be easily and conveniently operated and which may be applied to cars now in use without altering the construction or operation of the foundation brake rigging.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, in which—

Figures 1, 2 and 3 are detail views.

Referring now to the drawings, 5 denotes a supporting member adapted to be secured to any convenient part of the car, as by means of bolts passing through perforated lugs 6. This casing or member supports a main shaft 7 having hand operative means such as wheel 8 at its upper end. Its lower end 10 is threaded throughout a considerable portion of its length and coacts with a telescoping threaded member 11, the lower portion of which is connected at 12 with a chain leading to the foundation brake rigging. Suitable guides 14 coact with the member 11, thereby to prevent a relative turning movement thereof when the brakes are applied. A stop pin or collar 15 prevents a disassembling of the parts.

The upper part of the support 5 is provided with a chamber 16 which may be closed, if so desired, and houses a spring 17. Acting on the under side is a ball thrust bearing 18. A suitable collar 20 is interposed on the upper side of the bearing to hold parts out of engagement with top cover 21. This top cover has a cam lug 22 adapted to be engaged by a load stop pin 23 on the main shaft 7 when the pull on this main shaft exceeds a certain predetermined amount as measured by the spring 17. When this overload occurs the shaft 7 moves relatively downwardly, thereby to bring the stop 23 into engagement with the stop lug 22 and prevent a further turning of the hand wheel 8, thus preventing any overloading or injurious strain being transmitted to the brake rigging.

The washer is preferably provided with a notch at one side adapted to coact with a fin or rib 24 extending along one side of the inner portion of the housing 16, thereby to prevent a relative turning of the thrust bearing as the brakes are applied.

The operation of this device is substantially as follows: The hand wheel 8 is turned and by reason of its threaded telescopic engagement with the member 11, this member 11 moves relatively upwardly between the guides 14, thereby to transmit power and apply the brakes. When the excessive load point is reached the spring 17 will be compressed by reason of the downward pull exerted through the shaft 7 and thrust bearing 18, thereby to bring the stops 22 and 23 into engagement and prevent a further rotation thereof. On release of the brakes, the hand wheel and shaft move relatively upward, thereby carrying the stops out of engagement and permit further free turning of the hand wheel to full release.

From the above it will be seen that the present invention provides a simple and practical high power hand brake mechanism of strong and durable construction and adapted to accomplish, among others, all the objects herein set forth.

I realize that considerable variation is possible in the details of construction and arrangement of parts without departing from the spirit of my invention, and I therefore do not intend to limit myself to the specific form shown and described.

What I claim is:

1. In a hand brake mechanism, in combination, a support, a rotatable member carried thereby, a member having a telescopic threaded engagement therein, and means adapted to prevent overload being transmitted to the brake rigging.

2. In a hand brake mechanism, in combination, a support, a rotatable member carried thereby, a member having a telescopic threaded engagement therein, and means adapted to prevent overload being transmitted to the brake rigging, said means comprising an automatically acting stop carried by one of said telescopic members.

3. In a hand brake mechanism, in combination, a support, a rotatable member carried thereby, a member having telescopic threaded engagement therein, and means adapted to prevent overload being transmitted to the brake rigging, comprising an automatically acting stop carried by one of said telescopic members and means adapted to permit a yieldingly longitudinal movement of said members to carry said stop into interlocking position when overload occurs.

4. In a hand brake mechanism, in combination, a main shaft, hand operative means adapted to rotate the same, a member having a threaded telescopic engagement therewith adapted to be connected with the foundation brake rigging, a thrust bearing, a spring coacting therewith, and a stop adapted to prevent operation of the brakes when a predetermined strain is exerted on said brake rigging.

5. In a hand brake mechanism, in combination, a support, a shaft carried thereby, a stop on said shaft, a stop on said support, and spring means normally holding said stops out of engagement but permitting engagement thereof on rotation of the shaft when overload occurs.

6. In a hand brake mechanism, in combination, a support, a shaft carried thereby, a stop on said shaft, a stop on said support, and spring means normally holding said stops out of engagement but permitting engagement thereof on rotation of the shaft when overload occurs, one of said stops having a cam surface upon which the stop rides, thereby to permit unwinding.

7. In a hand brake mechanism, in combination, a rotatable shaft, means yieldingly holding said shaft against axial movement, and a lock for said shaft when axial movement occurs, thereby preventing further rotary movement of the shaft and consequent overload on the brake rigging.

In testimony whereof I affix my signature.

WILLIAM H. SAUVAGE.